United States Patent [19]
Heim

[11] Patent Number: 5,391,358
[45] Date of Patent: Feb. 21, 1995

[54] GAS PURIFICATION SYSTEM

[75] Inventor: Carl J. Heim, Amherst, N.Y.

[73] Assignee: Praxair Technology, Inc., Danbury, Conn.

[21] Appl. No.: 933,136

[22] Filed: Aug. 21, 1992

[51] Int. Cl.$^6$ .................. B01D 53/14; B01D 53/30; B01J 8/04; C01B 23/00
[52] U.S. Cl. .................. 422/171; 55/270; 95/11; 95/118; 95/138; 96/109; 96/111; 96/121; 422/177; 422/190; 422/193; 422/239; 423/262
[58] Field of Search ............... 422/168, 169, 170, 171, 422/177, 193, 239, 189, 190; 55/270, 29, 30, 33; 423/262; 95/116, 117, 118, 138, 11; 96/109, 121, 111

[56] References Cited

U.S. PATENT DOCUMENTS

| | | | |
|---|---|---|---|
| 3,963,462 | 6/1976 | Golovko et al. | 95/116 |
| 4,376,640 | 3/1983 | Vo | 95/138 |
| 4,449,991 | 5/1984 | Brannon et al. | 95/136 |
| 4,713,224 | 12/1992 | Taunhankar et al. | 423/219 |
| 4,985,052 | 1/1991 | Haruna et al. | 95/138 |
| 5,101,942 | 1/1993 | Jain | 95/141 |
| 5,106,399 | 4/1992 | Fisher | 62/22 |
| 5,110,569 | 5/1992 | Jain | 423/230 |
| 5,123,375 | 6/1992 | Hansen | 55/350.1 |
| 5,163,980 | 11/1992 | Kovach | 95/11 |
| 5,238,658 | 8/1993 | Makioka et al. | 95/116 |

FOREIGN PATENT DOCUMENTS

| | | |
|---|---|---|
| 294142 | 12/1988 | European Pat. Off. |
| 0454531 | 4/1991 | European Pat. Off. ..... C01B 21/04 |
| 4100933 | 7/1992 | Germany. |
| 4358516 | 11/1992 | Japan. |

Primary Examiner—Robert J. Warden
Assistant Examiner—L. M. Crawford
Attorney, Agent, or Firm—Chung K. Pak

[57] ABSTRACT

Processes and systems for purifying high purity helium group gas which may have been contaminated with water, oxygen and/or hydrogen during its transmission to customers' sites.

11 Claims, 4 Drawing Sheets

GAS PURIFICATION SYSTEM

FIELD OF THE INVENTION

The present invention relates to processes and systems which are useful for purifying gases, especially helium group gases.

BACKGROUND OF THE INVENTION

High purity helium group gases are becoming increasingly important in various industrial processes. The improvement in the purity level of the helium group gases has increased their application in many industrial fields including welding, cryogenics, leak detection, semiconductor manufacturing, superconducting, etc. These gases are generally recovered as a by-product during the separation of air to produce oxygen and nitrogen. Much of helium, however, is extracted from natural gas by successive liquification and purification.

Once the gases are concentrated or purified, they are usually transported to the use point via supply pipelines, gas cylinders or storage containers on rail cars or tractor trailers. During the transmission, however, the gases may be contaminated with oxygen, hydrogen and/or moisture. The helium at a delivery location, for example, contains 1 ppm moisture but, by the time it reaches the use point, the helium may have as much as two to three ppm moisture. Presumably, the moisture is from ambient in-leakage and/or desorption of moisture from the metal that is used for constructing the supply pipelines, gas cylinders or storage containers. Replacing the metal to inhibit contamination, however, would not be economically feasible since the supply pipelines, for instance, are normally quite long.

To mitigate such a problem, the use of commercial dryers or purifiers has been considered. The commercially available dryers and purifiers are either disposable type units (getter type unit) or regenerable type units (combination of thermal/chemical swing, pressure swing or both). Installing these dryers or purifiers at the use point is found to be unsuitable due to their complexity, expansiveness and inefficiency. The problem with the commercial disposable type units, for instance, is the difficulty of insuring the removal of contaminants without the use of on line analytical equipment while the problem with the commercial regenerable type units is complexed equipment involving automatic switching valves, regeneration means and/or possibly computer controlling means, which are expansive and elaborate.

Therefore, there is a need to design a purifier or dryer system which is suitable for installation at the use point, i.e., where the high purity helium group gases are used to produce particular products, devices, etc. In other words, less complex purifiers or dryers, which are efficient, effective and inexpensive, are desirable.

SUMMARY OF THE INVENTION

According to the present invention, the need for an effective and efficient purifier or dryer which is suitable for the installation at the use point is met by a purification system capable of shifting or reversing the flow of helium group gases. The system comprises:

(a) at least two vessels containing desiccants, adsorbents and/or oxidation catalysts;
(b) at least one first conduit means for connecting said at least two vessels, said at least one first conduit means having at least two valves for controlling, shifting or directing the flow of helium group gases into at least one inlet of any one of said at least two vessels;
(c) at least one helium group gas inlet conduit means having first and second ends, with the first end being connected to said at least one first conduit means between said at least two valves and the second end being designed to be fastened or connected to a high purity helium group gas supply line, a cylinder or a storage container;
(d) at least one second conduit means for connecting said at least two vessels, said second conduit means having at least two valves;
(e) at least one helium group gas outlet conduit means disposed between said at least two valves of said at least one second conduit means for the withdrawal of helium group gas from at least one outlet of any one of said at least two vessels;
(f) at least one circulating conduit means connected to said at least one first and second conduit means for directing the flow of helium group gas from at least one outlet of any one of said at least two vessels to at least one inlet of any one of said at least two vessels; and
(g) at least one sampling means located at said at least one circulation conduit means to determine a desired flow arrangement for helium group gas.

When the helium group gas contains an undesired amount of oxygen and hydrogen in addition to moisture, adsorbents and/or catalysts for chemisorbing and/or reacting oxygen and hydrogen may be used in conjunction with the desiccants. The desiccants, adsorbents and/or catalysts are fixedly placed within each vessel so that they are held in place during shipment or regeneration. The vessels involved are designed identically and subject to identical temperature and pressure conditions during the removal of contaminants.

As used herein the term "catalysts" means a solid material which is capable of increasing the rate of specific chemical reactions under certain reaction conditions.

As used herein the term "adsorbent" means a solid material which surface is capable of bonding with certain components of a gas mixture in a selective manner upon contacting the gas mixture.

As used herein the term "chemisorbing" means a process in which certain components of a gas mixture selectively adhere to the surface of the solid as a result of chemical forces.

As used herein the term "high purity helium group gas" means any gas selected from helium, argon, neon, krypton, xenon or mixtures of two or more thereof, having the desired purity level. Generally, the high purity helium group gas has up to about 20 ppm by volume of contaminants, such as water, oxygen and/or hydrogen.

BRIEF DESCRIPTION OF THE DRAWING

The following drawings are illustrations of some of embodiments of the present invention and are not intended to limit the scope of the invention.

DETAILED DESCRIPTION OF THE INVENTION

The present invention relates to processes and systems for purifying gases, especially high purity helium group gases which may have been contaminated during its transmission. The systems are specifically designed for flexibility, efficiency and effectiveness in carrying out the processes for purifying high purity helium gases. They can be constructed with any known tubing materials, any known valves and any known connectors. It is, however, desirable to utilize diphragm valves, electropolished tubing and high purity connections such as those sold under the trademark "VCR® connectors" in constructing the purification systems to enhance performance, prolong the life of purification systems and improve efficiency.

Figure 1:
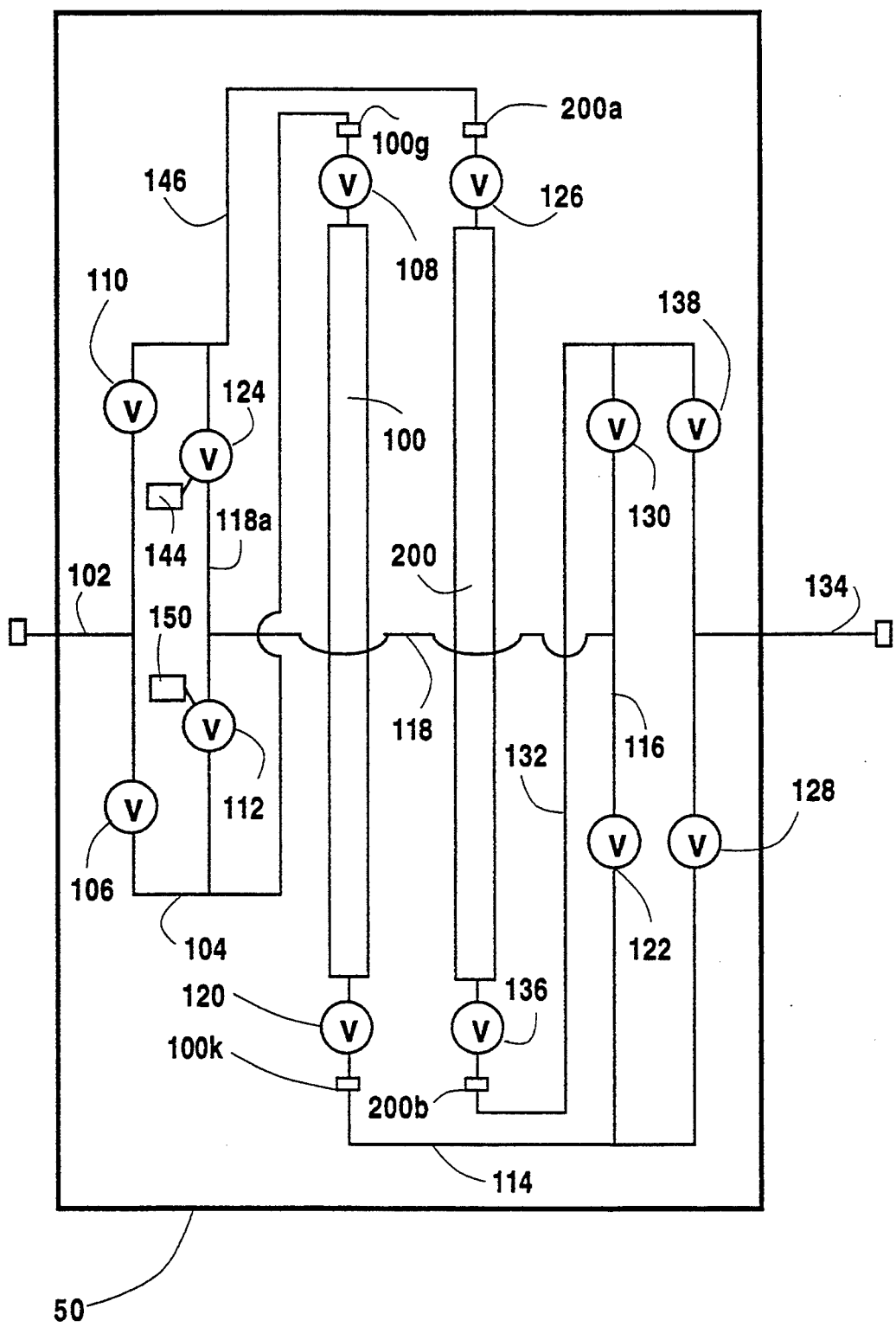
FIGS. 1-3 are schematic views of purification systems which are capable of shifting or reversing the flow of helium group gas to provide a desired flow arrangement.
Figure 2:
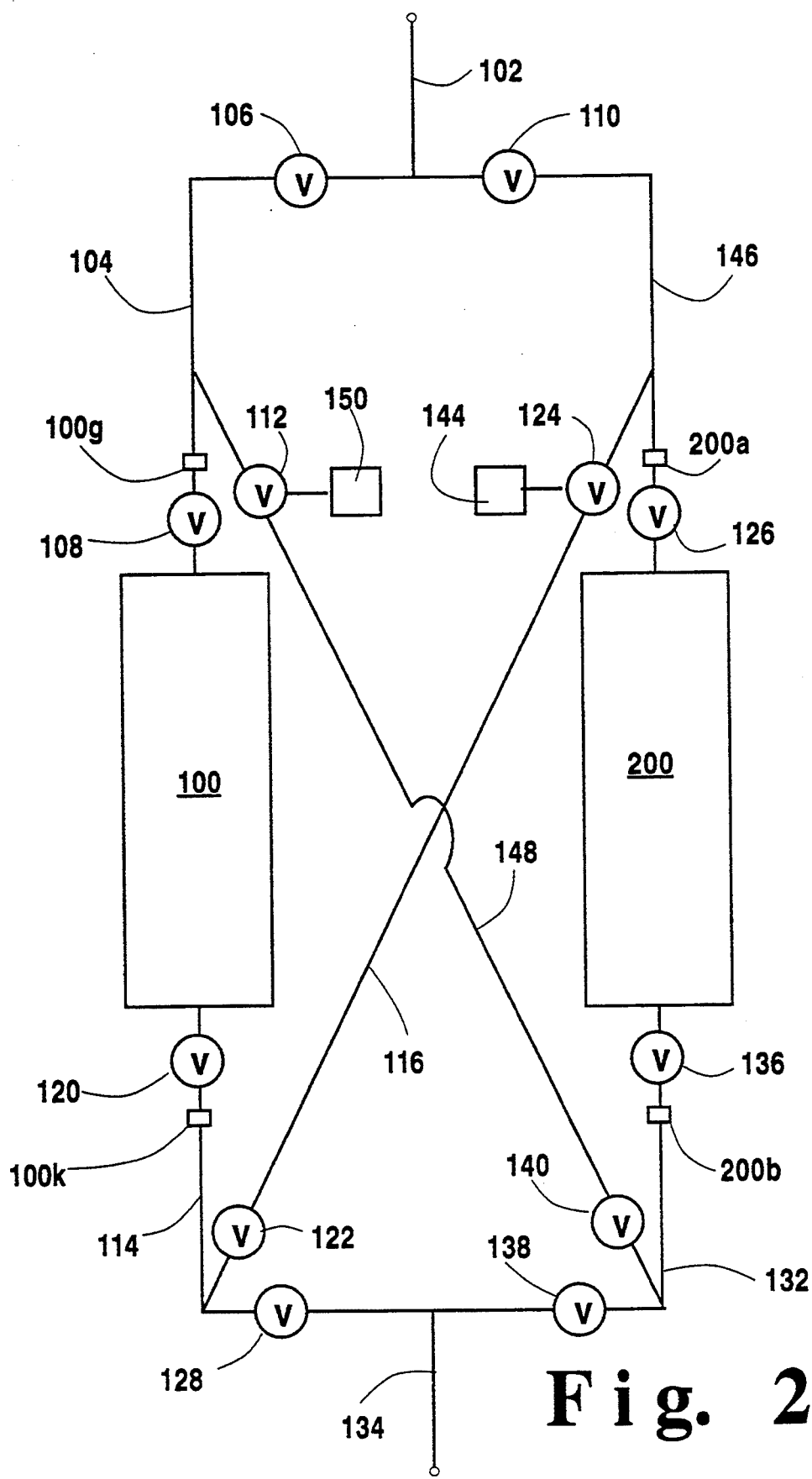
Figure 3:
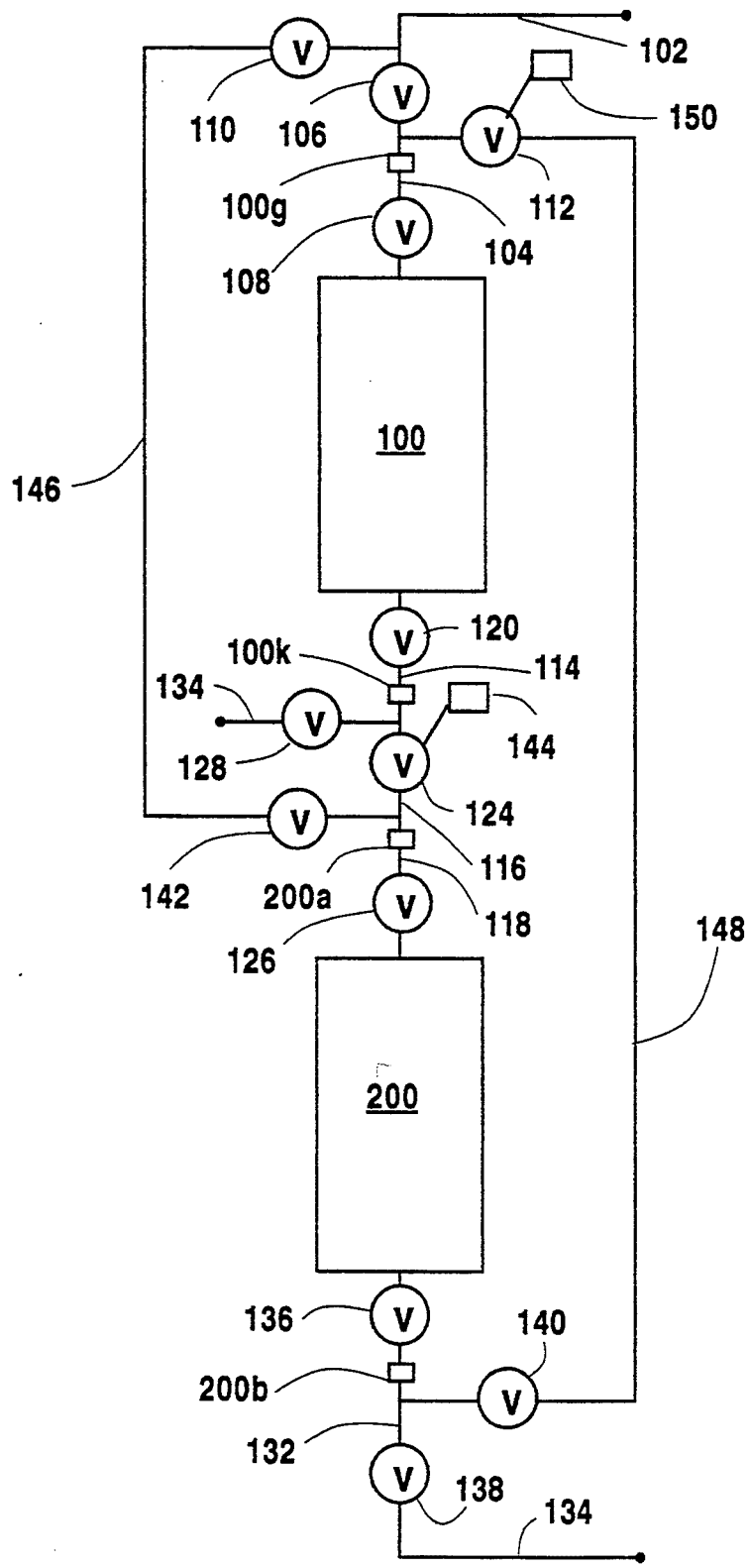

Now referring to the drawings, particularly FIGS. 1-3, there are schematic views of purification systems which are useful for purifying high purity helium group gases. Among the purification systems illustrated, the purification system of FIG. 1 is most preferred. The preference for FIG. 1, however, in no way precludes numerous variations of such a system which will become apparent to one of ordinary skill in the art or FIGS. 2 and 3 and their variations which will become apparent to one of ordinary skill in the art. The purification of the high purity helium group gases may be or may not be carried out at a super critical condition in these systems.

In FIGS. 1-3, a high purity helium group gas, which has been contaminated with a trace amount of water, oxygen and/or hydrogen during its transmission to its usage point, is delivered to at least one inlet means of a purification system which may be supported by an aluminum or steel frame (50). By opening valves 106 and 108 and closing valves 110 and 112, the contaminated high purity helium group gas is directed from the inlet means to at least one first vessel 100 through lines 102 and 104. In the first vessel 100, the contaminated helium group gas is contacted with contaminant removing means therein at a temperature of about −30° F. to about 150° F. (preferably at ambient temperature) and a pressure of about 1 psig to about 250 psig. The contaminant removing means are desiccants for removing water and adsorbents and/or oxidation catalysts for chemisorbing and/or reacting oxygen and hydrogen. The employment of the desiccants, adsorbents and/or oxidation catalysts is dependent on the degree of water, oxygen and/or hydrogen contamination and the effects thereof on the helium group gas application. When the adsorbents and/or oxidation catalysts are employed with the desiccants in the first vessel 100, they should constitute about 10% to 70% by volume, preferably 30% to 50% by volume, based on the total volume of the desiccants and them to recover a helium group gas having the desired purity since the high purity helium group gas is often found to be contaminated with about 0.1-3 ppmv of water, about 0.1-3 ppmv of oxygen and/or about 0.1-3 ppmv of hydrogen.

Figure 4:
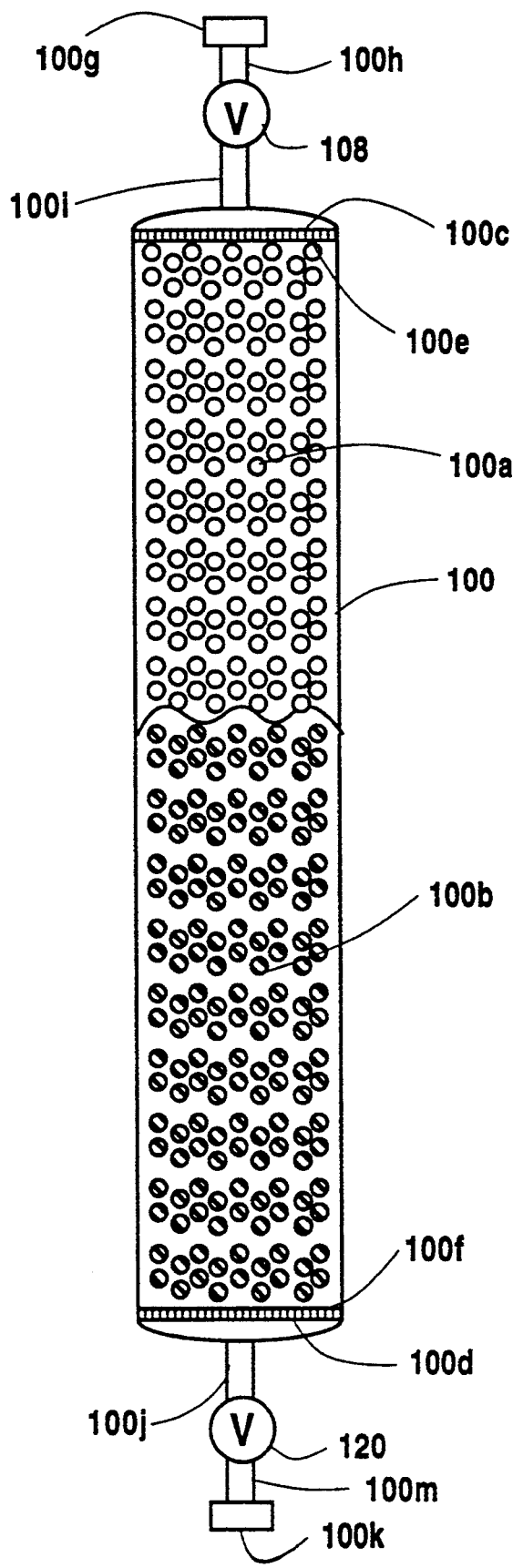
FIG. 4 is a schematic view of a vessel containing spherical molecular sieve and transition metal oxide particles.
Figure 4A:
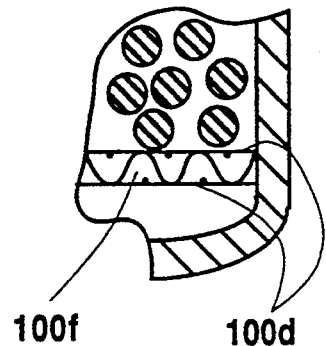
FIG. 4a is a detail view of a perforated plate/screen combination, which is welded to place spherical molecular sieve and transition metal oxide particles in a fixed manner within the vessel of FIG. 4.

As shown in FIG. 4, the vessel 100 is preferably in cylindrical form having a small diameter in the range of about 1 to about 12 inches, thus making it easily removable or mountable in the purification system in addition to being able to construct easily to withstand high pressure. The inlet end of the vessel 100 is made up of a connection 100g, preferably VCR type connection, which allows for the removal and replacement of the vessel 100, about ¼ to 2 inch diameter electropolished tubing section 100h, and a valve 108, followed by another ¼ to 2 inch diameter electropolished tubing section 100i. All the connections are welded with the last tubing section penetrating the top head section of the vessel 100. At the top and bottom of the vessel 100, a perforated plate 100c/screen 100e combination and a perforated plate 100d/screen 100f combination, as shown by FIG. 4a, are located. The perforated plates 100c and 100d have about 15%-20% open area while the screens 100e and 100f are characterized by 25-75 mesh openings. These open area and openings serve to support the sieve bed and distribute the gas flow. The exit end of the vessel 100 is designed exactly the same as the inlet end, i.e., about ¼ to 2 inch electropolished tubing section 100j penetrating the bottom head section of the vessel 100, which is welded to a valve 120 followed by another ¼ to 2 inch electropolished tube section 100 m having ¼ to 2 inch connection 100k.

The desiccants, adsorbents and/or catalysts are loaded prior to welding the top head section of the vessel 100. It is desirable to fixedly placed the desiccants 100a, and adsorbent and/or oxidation catalysts 100b in a packed bed form in the first vessel 100 between two perforated plates 100c and 100d having screens 100e and 100f, respectively so that they are held in place during shipment and reactivation (regeneration). The employment of the desiccants, adsorbents and/or oxidation catalysts is dependent on what contaminant or contaminants are to be removed from the helium group gas. If water, for example, is to be removed in conjunction with oxygen and hydrogen, the desiccants are loaded first as the bottom layer and the adsorbents and/or oxidation catalysts are then loaded to form the top layer. If hydrogen and moisture are to be removed with an influent concentration of about 2 ppmv to 3 ppmv respectively, the desiccants layer 100a constitutes about 20 to 30 inch in height whereas the adsorbents and/or oxidation catalysts layer 1010b constitutes about 30 to 40 inches in height. The preferred desiccants employed are adsorbents (molecular sieves, silica gel and/or activated alumina) having a diameter in the range of about 0.5 to about 3.2 mm while the preferred adsorbents and/or oxidation catalysts employed are transition metal oxide containing materials (nickel and/or copper supported on alumina and/or molecular sieve) having a diameter in the range of about 0.5 to about 3.2 mm. The preferred desiccants, adsorbents and/or catalysts having preferred sizes are useful in increasing or improving contaminant removal.

The resulting high purity helium group gas derived from the first vessel 100 is directed to at least one second vessel 200 through lines 114 and 116 and possibly lines 118, 118a and/or 146, if necessary. The direction of the high purity helium group gas flow to the second vessel 200 is achieved by opening valves 120, 122 and 124 and possibly a valve 126 (if present) and by closing valves 128 and/or 130. In the second vessel 200, at least a portion of unremoved contaminants in the high purity helium group gas is removed upon contacting contaminant removing means at a temperature of about −30° F. to about +150° F. and a pressure of about 1 psig to about 250 psig, preferably at the same temperature and pressure conditions as the first vessel 100. The second vessel 200 is preferably designed exactly the same manner as the first vessel 100, e.g., the vessel in cylindrical form having a specific diameter, the inlet end comprising a connection 200a, a valve 126 and electropolished tubing sections, the exit end comprising a connection 200b, a valve 136d and electropolished tubing sections, and perforated plate/screen combinations. In addition, the contaminant removing means which are identical to those in the first bed are fixedly placed between the perforated plates having screens respectively in the same manner as the first vessel 100.

After removing the contaminants further from the high purity helium group gas derived from the first vessel 100 in the second vessel 200, the high purity helium group gas product is recovered through the outlet line 134 by opening valves 136 and 138 disposed in line 132 and closing a valve 140 (if present). The outlet line 134 can be connected to any system which utilizes a helium group gas having a particular purity level to produce particular products. By connecting, the high purity helium group gas having the desired purity can be directly used in producing the desired product or device.

Sampling means 144 is located between the first vessel 100 and the second vessel 200 to determine the purity level of the helium group gas from the first vessel 100 and to determine the appropriate flow arrangement. The determination of the purity level and appropriate flow arrangement is made by sampling the high purity helium group gas derived from the first vessel periodically (usually once every two or four weeks) as it flows into the second vessel 200. The purity level of the high purity helium group gas from the second vessel can also be determined by extrapolating the sampling result obtained from analyzing the helium group gas from the first vessel 100 if the second vessel 200 which is subject to identical conditions, i.e., identical design, identical contaminant removing means and identical temperature and pressure conditions, as the first vessel 100, is utilized.

When the sampling result indicates that the purity level of the helium group gas from the first vessel 100 is substantially deteriorated, the first vessel 100 is either replaced with a new vessel containing new desiccants, adsorbents and/or catalysts or is reused after regenerating at least partially deactivated desiccants, adsorbent and/or catalysts present therein. During the regeneration of the deactivated desiccants, adsorbents and/or catalysts or the replacement of the first vessel 100 with the new vessel, the direction of the contaminated helium group gas flow is shifted. By opening valves 110 and 126 (and possibly 142 if available in the system) and closing valves 106 and 124, the helium group gas flows to the second vessel 200, instead of the first vessel 100, through lines 102 and 146. Subsequently, the purified helium group gas from the second vessel is removed through lines 132 and 134 by opening valves 136 and 138 and closing valves 128 and 130 or 128 and 140 (depending on the system involved).

To replace or reuse the first vessel 100, the first vessel is first removed from the purification system after closing the valves 108 and 120. If the new vessel is to be employed, it can be readily employed by connecting its connectors to the purification system lines, e.g., lines 104 and 114, where the first vessel was previously connected. If the first vessel is to be reused, its desiccants, adsorbents and/or catalysts are regenerated through various known methods preferably at a location away from the purification system, i.e., away from the use point.

For example, desiccants regeneration may be achieved by raising the temperature of the vessel to 600°–750° F. via indirect heating. During heating, a small purge flow of dried inert gas (1-5 scfm), such as nitrogen or argon, is applied to sweep any of the desorbed water from the desiccants. Heating continues until the desiccants are sufficiently void of water. The duration of this regeneration is dependent of the amount of water adsorbed on the desiccants and the desired purity level of the helium group gas product. Typical desorption time periods are from about forty-eight to about one hundred sixty-eight hours.

After the desorption step is completed, the heat is turned off and the vessel is allowed to cool under a continuous purge (1-5 scfm) of the dried inert gas containing less than 1 ppm moisture that is to be subsequently treated. When the vessel is cooled to ambient conditions, the exit valve (120) is closed and the vessel is pressurized to about 8-12 psig. The inlet valve 108 is subsequently closed to maintain the pressure in the vessel for shipping back to the use point.

For oxygen contaminated adsorbents and/or catalysts regeneration, the vessel is first raised to a temperature of about 400° F. to 600° F. and a gas mixture of four to five percent hydrogen in an inert gas is delivered to the vessel. The vessel is then put through the same regeneration sequence as described for the desiccant regeneration.

For hydrogen contaminated adsorbents and/or catalysts, regeneration is carried out in the exact manner as described for the oxygen contaminated adsorbent and/or catalyst except that oxygen is substituted for hydrogen in the first regeneration gas mixture.

Upon employing the new vessel or reemploying the first vessel 100 having regenerated desiccants, adsorbents and/or catalysts, the helium group gas flow arrangement may be changed back to a serial mode flow, i.e., the first vessel followed by the second vessel, as indicated above by opening valves 106, 108, 120, 122, 124, 126, 136 and 138 and closing valves 110, 112, 128 and 130 (and valves 140 and/or 142 if present). Alternatively, the helium group gas flow arrangement may be changed to a reverse serial mode flow, i.e., the second vessel followed by the first vessel, by opening valves 110, 126, 136, 112, 108, 120,and 128,(and possibly valves 130, 140 and 142 if present) and closing valves 106, 124 and 138 ( and possibly a valve 122 if present).

During the reverse serial mode flow, a sampling means 150 is used to determine the purity level of the high purity helium group gas derived from the second vessel 200 and to determine the appropriate new flow arrangement. The sampling means 150 is located between the first and second vessels so that the high purity helium group gas from the second vessel can be sampled periodically (every two to four weeks) as it passes to the first vessel 100. When the sampling result indicates that the purity level is declining to below the desired level, the helium group gas flow arrangement is altered to accommodate the replacement of the second vessel with a new vessel containing new contaminant removing means or the regeneration of the contaminant removing means in the second vessel. The alteration can be achieved by opening valves 106, 108, 120 and 128 and closing valves 110, 112, 122 and 138 ( or 110, 122 and 124 for FIG. 3), thereby allowing the contaminated helium group gas to flow into the first vessel and then to the outlet line 134.

Upon regenerating the contaminant removing means in the second vessel or replacing the second vessel with the new vessel as indicated above, the flow arrangement is again changed to either a serial mode flow, i.e., the first vessel followed by the second vessel, or a reverse serial mode flow, i.e., the second vessel followed by the first vessel. The flow arrangement can be changed periodically as indicated above to provide a high purity helium group gas having the desired purity level in a continuous manner. It should be understood, however, that the purification system of FIG. 1, 2 or 3 can also be used in a batch-wise manner.

As can be seen, the present invention imparts much needed flexibility, efficiency and effectiveness to a purification system which can be used at the use point, i.e., a location where the high purity helium group gas is to be used to manufacture, produce and/or analyze products or devices. The needed efficiency, effectiveness and flexibility of the purification system are attained by placing the sampling means and valves in particular locations in conjunction with employing particular conduit arrangements. This design allows the purification system to operate in a dual mode, a serial mode or a reverse serial mode by simply closing and opening certain valves, thereby obtaining high purity helium gas having the desired purity in a continuous manner. Also, the simplicity of operation and design causes the purification system to be more suitable for the use point, since it can be easily operated manually without the need for much space.

Although the process and apparatus of the invention has been described in detail with reference to certain embodiments, those skilled in the art will recognize that there are other embodiments of the invention within the spirit and scope of the claims.

What is claimed is:

1. A purification system capable of shifting or reversing a flow of contaminated helium group gas, said system comprising:
    (a) at least one first vessel containing desiccants, adsorbents, and/or oxidation catalysts, said at least one first vessel being capable of being maintained at about 1 psig to about 250 psig and having at least one inlet and at least one outlet;
    (b) at least one second vessel containing desiccants, adsorbents and/or oxidation catalysts, said at least one second vessel being capable of being maintained at about 1 psig to about 250 psig and having at least one inlet and at least one outlet;
    (c) at least one first conduit means for connecting said at least one outlet of said first vessel and said at least one inlet of said second vessel, said at least one first conduit means having at least one sampling means;
    (d) at least one second conduit means for connecting said at least one inlet of said first vessel and said at least one first conduit means, said at least one second conduit means having at least two valves for directing a flow of contaminated helium group gas directly to said at least one first conduit means or directly to said first vessel;
    (e) at least one helium group gas inlet conduit means having first and second ends, with the first end being connected to said at least one second conduit means between said at least two valves;
    (f) a source containing a high purity helium group gas in fluid communication with said at least one helium group gas inlet conduit;
    (g) at least one third conduit means for connecting said at least one outlet of said second vessel and a section of said at least one second conduit means, said section being disposed between said at least one inlet conduit mean and said at least one inlet of said first vessel; and
    (h) at least one outlet means disposed on or connected with said at least one third conduit means and/or said at least one first conduit means.

2. A purification system capable of shifting or reversing a flow of helium group gas, said system comprising:
    (a) at least two vessels containing desiccants, adsorbents and/or oxidation catalysts;
    (b) at least one first conduit means for connecting said at least two vessels, said at least one first conduit means having at least two valves for controlling, shifting or directing the flow of helium group gas into at least one inlet of any one of said at least two vessels;
    (c) at least one helium group gas inlet conduit means having first and second ends, with the first end being connected to said at least one first conduit means between said at least two valves;
    (d) a source containing a high purity helium group gas in fluid communication with said at least one helium group gas inlet conduit;
    (e) at least one second conduit means for connecting said at least two vessels, said second conduit means having at least two valves;
    (f) at least one helium group gas outlet conduit means disposed between said at least two valves of said at least one second conduit means for the withdrawal of helium group gas from at least one outlet of any one of said at least two vessels;
    (g) at least one circulating conduit means connected to said at least one first and second conduit means for directing the flow of helium group gas from at least one outlet of any one of said at least two vessels to at least one inlet of any one of said at least two vessels; and
    (h) at least one sampling means located at said at least one circulation conduit means to determine a desired flow arrangement for helium group gas.

3. The purification system according to claim 2, wherein said desiccants are selected from the group consisting of molecular sieve, silica gel, activated alumina and mixtures thereof and said adsorbents and/or oxidation catalysts comprise at least one transitional metal oxide supported on aluminum and/or molecular sieve.

4. The purification system according to claim 3 wherein said desiccants, said adsorbents and/or oxidation catalysts are in spherical form having a diameter in the range of about 0.5 mm - about 3.2 mm.

5. The purification system according to claim 3, wherein each vessel contains said desiccants, and said adsorbents and/or catalysts and wherein said desiccants constitute about 30% to 90% by volume based on the total volume of said desiccants, and said adsorbents and/or catalysts.

6. The purification system according to claim 5, wherein a 20-30 inch layer of said desiccants and a 30-40 inch layer of said adsorbents and/or catalysts are fixedly placed between said at least two perforated plates and/or mesh screens.

7. The purification system according to claim 6, wherein said at least two vessels are cylinders having diameters in the range of about 1 to 12 inches.

8. The purification system according to claim 2, wherein said at least one first conduit means and second conduit means are at least partially electropolished and have at least one diaphragm valve and connection means.

9. The purification system according to claim 2, wherein said circulation conduit means having said sampling means comprises at least one upper circulation conduit for connecting two different sections of said at least one first conduit means, said two different sections being located between the inlets of said at least two vessels and said two valves located in or on said at least one first conduit means, at least one lower circulation conduit for connecting two different sections of said at least one second conduit means, said two different sections being located between the outlets of said at least two vessels and said at least two valves on or in said at least one second conduit means; and at least one middle circulation conduit for connecting said at least one lower conduit and said at least one upper conduit.

10. A system capable of purifying high purity helium group feed gases and capable of being used at a high purity helium group gas use point, said system comprising:
(a) at least one first vessel containing contaminant removing means capable of removing water, oxygen and/or hydrogen, said at least one first vessel having at least one outlet and inlet;
(b) at least one second vessel containing contaminant removing means capable of removing water, oxygen and/or hydrogen, said at least one second vessel having at least one outlet and inlet;
(c) conduit means for passing high purity helium group gas into the inlets of both said at least one first and second vessels;
(d) a source containing a high purity helium group gas in fluid communication with said conduit means for passing high purity helium group gas;
(e) valve means for directing a flow of high purity helium group gas to either said at least one inlet of said at least one first vessel or said at least one inlet of said at least one second vessel;
(f) conduit means for withdrawing high purity helium group gas from said at least one outlet of said at least one first and/or second vessels;
(g) conduit means for passing high purity helium group gas from the outlet of said at least one first vessel and/or from the outlet of said at least one second vessel to the inlet of said at least one second vessel and/or to the inlet of said at least one first vessel; and (h) sampling means for determining the purity level of high purity gas and a desired gas flow arrangement, wherein said sampling means is located at said conduit means for passing high purity helium group gas from the outlet of said at least one first vessel and/or from the outlet of said at least one second vessel to the inlet of the said at least one second vessel and/or the inlet of said at least one first vessel.

11. A purification system capable of shifting or reversing a flow of helium group gas, said system comprising:
(a) at least two vessels containing desiccants, adsorbents and/or oxidation catalysts;
(b) at least one first conduit means for connecting said at least two vessels, said at least one first conduit means having at least two valves for controlling, shifting or directing the flow of helium group gas into at least one inlet of any one of said at least two vessels;
(c) at least one helium group gas inlet conduit means having first and second ends, with the first end being connected to said at least one first conduit means between said at least two valves;
(d) a source containing a high purity helium group gas in fluid communication with said at least one helium group gas inlet conduit;
(e) at least one second conduit means for connecting said at least two vessels, said second conduit means having at least two valves;
(f) at least one helium group gas outlet conduit means disposed between said at least two valves of said at least one second conduit means for the withdrawal of helium group gas from at least one outlet of any one of said at least two vessels; and
(g) at least one circulating conduit means connected to said at least one first and second conduit means for directing the flow of helium group gas from at least one outlet of any one of said at least two vessels to at least one inlet of any one of said at least two vessels, said at least one circulating conduit means comprising at least one upper circulation conduit for connecting two different sections of said at least one first conduit means, said two different sections being located between the inlets of said at least two vessels and said two valves located in or on said at least one first conduit means, at least one lower circulation conduit for connecting two different sections of said at least one second conduit means, said two different sections being located between the outlets of said at least two vessels and said at least two valves on or in said at least one second conduit means and at least one middle circulation conduit for connecting said at least one lower circulation conduit and said at least one upper circulation conduit.

* * * * *